United States Patent

[11] 3,596,922

| [72] | Inventor | Fred A. Luttrell<br>Rt. 1, Box 580, St. Helens, Oreg. 97051 |
|---|---|---|
| [21] | Appl. No. | 829,524 |
| [22] | Filed | June 2, 1969 |
| [45] | Patented | Aug. 3, 1971 |

[54] UTILITY CART
1 Claim, 3 Drawing Figs.

[52] U.S. Cl. .................................................. 280/47.32,
280/47.13 R
[51] Int. Cl. ..................................................... B62b 1/00
[50] Field of Search............................................ 280/35,
47.32, 47.31, 47.13, 47.13 B, 47.3, 414 A; 9/1 TR

[56] References Cited
UNITED STATES PATENTS

| 817,677 | 4/1906 | Smith .......................... | 280/47.3 X |
| 1,109,520 | 9/1914 | Flower ........................ | 280/47.32 |
| 2,637,050 | 5/1953 | Oliver.......................... | 9/1 TR |
| 2,650,105 | 8/1953 | Costikyan..................... | 280/35 |
| 3,164,392 | 1/1965 | Lane ............................ | 280/47.13 B |

*Primary Examiner*—Benjamin Hersh
*Assistant Examiner*—Leslie J. Paperner
*Attorney*—Eugene M. Eckelman ABSTRACT: The cart of the invention includes a frame having a wheel at its forward end and a first frame portion extending rearwardly in substantially a horizontal plane from the wheel. An abutment is supported on said first frame portion. Second frame portions lead from the first frame portion in an outward and rearward flared direction and terminate in side arms leading upward and rearward. Leading inward from the upper ends of the side arms are lateral frame portions. The frame portions described form a rear opening arranged to receive longitudinally the forward end of a container to be seated forwardly against the abutment means. Upon mounting the container in the cart, the container can be wheeled like a wheelbarrow.

Patented Aug. 3, 1971

3,596,922

INVENTOR
FRED A. LUTTRELL

BY Eugene M. Eckelman
ATTORNEY

UTILITY CART

This invention relates to new and useful improvements in utility carts.

According to the present invention and forming an important objective thereof, a utility cart for containers has as its important objective to provide a novel arrangement for receiving one end of a container so that the container can be picked up at the other end and wheeled like a wheelbarrow.

Another object is to provide a cart of the type described having a novel frame structure adapted to receive one end of a container and arranged through the means of a leverage connection therewith to obtain a grip on the container.

Additional objects and advantages will become apparent and the invention will be better understood from the following description which illustrates a preferred form of the device.

DETAILED DESCRIPTION OF THE PREFERRED EMBODIMENTS

Figure 1:
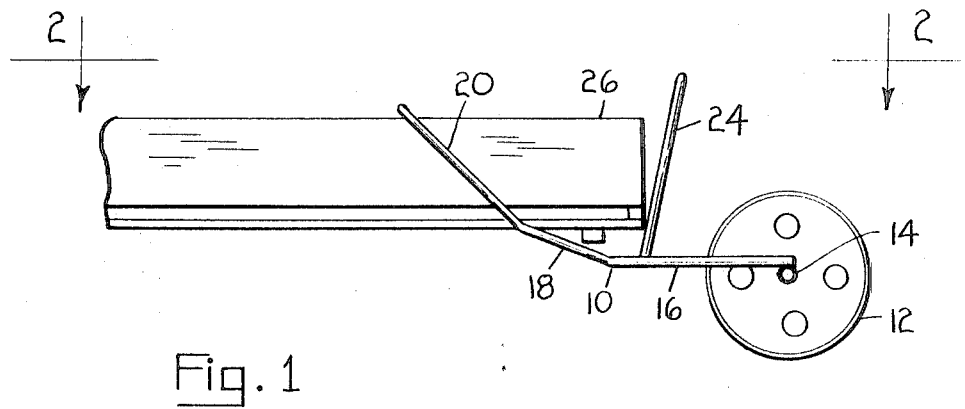
FIG. 1 is a side elevational view of the present utility cart, a container engaged therewith being shown in full lines.
Figure 2:
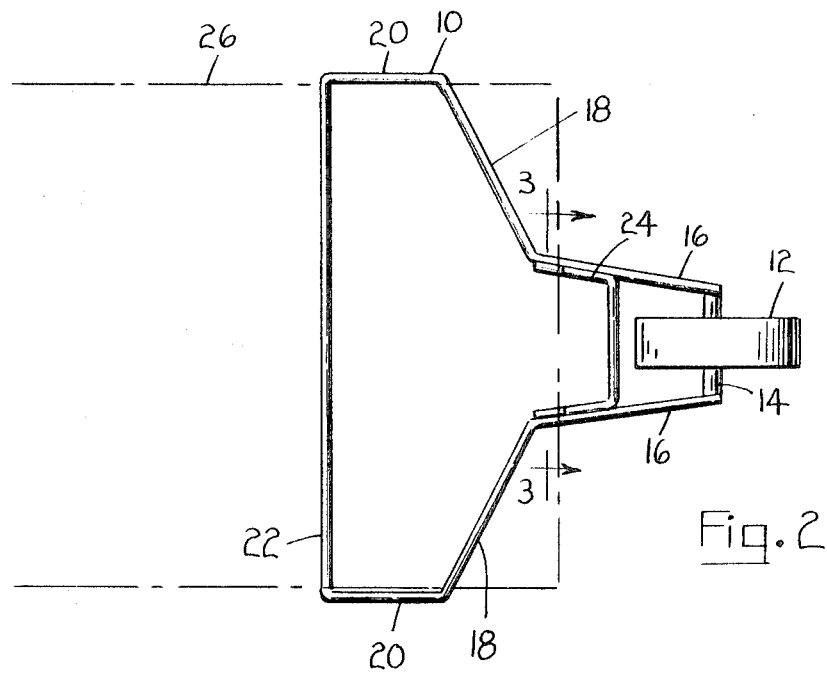
FIG. 2 is a top plan view taken on the line 2-2 of FIG. 1, the container being shown in phantom lines.
Figure 3:
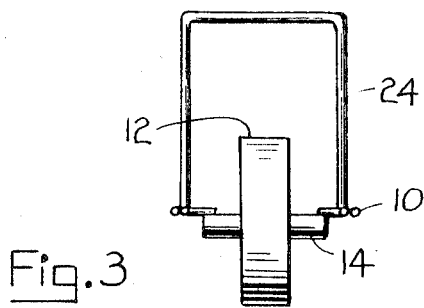
FIG. 3 is a sectional view taken on the line 3-3 of FIG. 2.

With particular reference to the drawings, the present invention comprises a frame 10 supported on a wheel 12. In the arrangement of structure shown, the wheel 12 is supported on an axle 14 from which extends rearwardly a pair of first frame portions 16 having the forward ends thereof secured to the axle and extending rearwardly preferably in a slightly flared relation to each other. Second frame portions 18 lead from the frame portions 16 in an upward and rearward direction, and third frame portions or arms 20 lead from the second frame portions 18 also in an upward and rearward direction. Arms 20 are interconnected by a top lateral frame portion 22.

Carried integrally on the first frame portion 16 is an abutment 24 which may be in the form of an inverted U-shaped frame having its ends secured, as by welding, to respective frame portions 16.

The present design of cart shown in the drawings is especially adaptable for use as a wheeled support for berry crate although it is to be understood that it can be custom made for various types of containers, requiring only of course that it be dimensioned to receive the container through the rear opening formed by the frame members 18, 20 and 22. The present cart is particularly adaptable for holding berry crates 26 and assists the berry picker in moving the crate along the row as he picks. By utilizing the present cart, it is merely necessary to pick up the back end of the crate and wheel it to a new position. It is not necessary to do any appreciable lifting since the cart is merely rolled along the ground. The width of the cart is not critical except that it must be at least the width of the crate. On the other hand, the vertical dimension of the frame and particularly the height of the opening formed at the rear is more critical as it is desirable that the cart not be capable of loosely pivoting vertically on a lateral axis in the cart so that the latter will have a fairly good grip on the crate. However, even though the rear opening of the cart has a substantially greater vertical dimension than the vertical dimension of the crate, a frictional connection results therebetween to hold the cart thereon in a manner such that the crate can be pulled backward without slipping out of the cart. More particularly, it is apparent that the forward end of the crate bears down on the frame just behind the abutment 24 which of course forces the lateral frame portion 22 down into engagement with the top edge of the crate. The weight of the forward end of the crate forcing the lateral frame portion 22 into engagement with the top of the crate forms a frictional connection sufficient to hold the crate in the cart under normal wheeling conditions.

By means of the frame structure of the invention, wherein the flared frame portions 18 and the arms 20 are inclined upwardly and to the rear, the crate has adequate room for insertion by angling it down at the rear and moving it, while inclined, into the rear opening of the frame. After the crate has been inserted it can be moved to a horizontal position, namely, the position of FIG. 1.

The cart can be made from inexpensive bendable bar stock, heavy gage wire, or even wood or plastic. When made from bendable material, it is apparent that the main frame portion thereof can be constructed from a single piece of stock. The abutment frame portion 24 is welded or otherwise secured to the main frame. The cart is inexpensive to manufacture, rugged in use, and can be stacked compactly.

It is to be understood that the form of my invention herein shown and described is to be taken as a preferred example of the same and that various changes in the shape, size and arrangement of parts may be resorted to without departing from the spirit of my invention. For example, the lateral frame portion 22 need not extend fully between the arms 20 since it is only necessary that the crate be engaged at its top edge on the sides to accomplish its connection with the cart.

Having thus described my invention, I claim:

1. A utility cart for containers of the type which are of rectangular, flat configuration and have bottom, side and front walls, with the tops thereof being open, comprising
   a. longitudinal frame means of substantially rigid material,
   b. a wheel on the forward portion of said frame means,
   c. said frame means having a pair of front portions supported on said axle on each side of said wheel and extending rearwardly,
   d. an upright abutment on the front portions of said frame means disposed rearwardly of said wheel and arranged to limit forward positioning of a container placed on the cart,
   e. said frame means extending rearwardly from said front portions in a pair of outwardly flared portions forming a support for the forward end of the container,
   f. said frame means further extending from said support frame portions into rearwardly and upwardly extending arms arranged to extend up opposite sides of the container,
   g. and a laterally projecting frame portion connected between said arms at the upper ends of the latter, said laterally projecting frame portion being arranged to extend over the top of the container whereby the container is arranged to have a forward portion thereof positioned between said arms and supported at one end on said support means under said laterally projecting frame portion for frictional detachable connection to the cart.